(12) United States Patent
Pope et al.

(10) Patent No.: US 9,711,954 B2
(45) Date of Patent: Jul. 18, 2017

(54) SNAP-IN SHUTTER SYSTEM FOR RACK OUT CIRCUIT BREAKERS

(71) Applicant: SCHNEIDER ELECTRIC USA, INC., Schaumburg, IL (US)

(72) Inventors: Thomas Pope, North Liberty, IA (US); Timothy Faber, Marion, IA (US); Nagesh Tumu, Cedar Rapids, IA (US)

(73) Assignee: Schneider Electric USA, Inc., Andover, MA (US)

( * ) Notice: Subject to any disclaimer, the term of this patent is extended or adjusted under 35 U.S.C. 154(b) by 0 days.

(21) Appl. No.: 15/024,605

(22) PCT Filed: Sep. 30, 2013

(86) PCT No.: PCT/US2013/062671
§ 371 (c)(1),
(2) Date: Mar. 24, 2016

(87) PCT Pub. No.: WO2015/047403
PCT Pub. Date: Apr. 2, 2015

(65) Prior Publication Data
US 2016/0248231 A1 Aug. 25, 2016

(51) Int. Cl.
*H02B 1/14* (2006.01)
*H02B 11/24* (2006.01)

(52) U.S. Cl.
CPC .............. *H02B 1/14* (2013.01); *H02B 11/24* (2013.01)

(58) Field of Classification Search
CPC .. H02B 1/14; H02B 11/24; H02B 2001/0155; H01H 9/22

USPC ................................. 361/616–617; 200/50.22
See application file for complete search history.

(56) References Cited

U.S. PATENT DOCUMENTS

| | | | |
|---|---|---|---|
| 4,773,870 A * | 9/1988 | Sinnig | H02B 11/24 200/50.27 |
| 5,097,382 A | 3/1992 | Leach et al. | |
| 5,327,321 A | 7/1994 | Rosen | |
| 5,343,355 A | 8/1994 | Ishikawa | |
| 6,452,810 B1 | 9/2002 | Wilcox | |
| 8,366,460 B2 | 2/2013 | Jurek et al. | |
| 8,604,368 B2 * | 12/2013 | Kim | H02B 11/24 200/50.22 |

(Continued)

FOREIGN PATENT DOCUMENTS

DE 10120750 C1 7/2002

OTHER PUBLICATIONS

European Search Report and Written Opinion mailed Mar. 22, 2017 in European Application No. 13894285.9, 6pp.

(Continued)

*Primary Examiner* — Zachary M Pape
(74) *Attorney, Agent, or Firm* — Locke Lord LLP

(57) ABSTRACT

The present disclosure provides a shutter system (150) for a cradle (100) of a rack out circuit breaker, which includes two rail assemblies (200, 300), a shutter (400) and a cam actuator (280). A first of the rail assemblies is configured to snap into an interior surface of one of the side walls (102, 104) of a cradle, and a second of the rail assemblies is configured to snap into an interi- or surface of an opposing side wall of the cradle. Each rail assembly includes a snap-in lock assembly and a slider movable between a front and back of the cradle along a corresponding side wall.

20 Claims, 13 Drawing Sheets

(56) References Cited

U.S. PATENT DOCUMENTS

| | | | |
|---|---|---|---|
| 8,917,494 B2* | 12/2014 | Parkerson | H02B 11/167 |
| | | | 200/50.22 |
| 9,184,572 B2* | 11/2015 | Gao | H02B 11/24 |
| 9,583,920 B2* | 2/2017 | Jakkireddy | H02B 11/133 |
| 2007/0137991 A1 | 6/2007 | Kashyap et al. | |
| 2009/0128999 A1 | 5/2009 | Deylitz et al. | |
| 2012/0196461 A1 | 8/2012 | Jurek et al. | |
| 2012/0261239 A1 | 10/2012 | Kim et al. | |

OTHER PUBLICATIONS

"Shutter, Shutter Padlock Provision and Shutter Indicator for UL/ANSI Masterpact NW Circuit Breakers", Bulletin 48049-152-01, Schneider Electric, Oct. 2005, pp. 1-12.
International Search Report and Written Opinion mailed Mar. 11, 2014 for PCT/US2013/062671, 11pp.

* cited by examiner

Section A-A

Section A-A

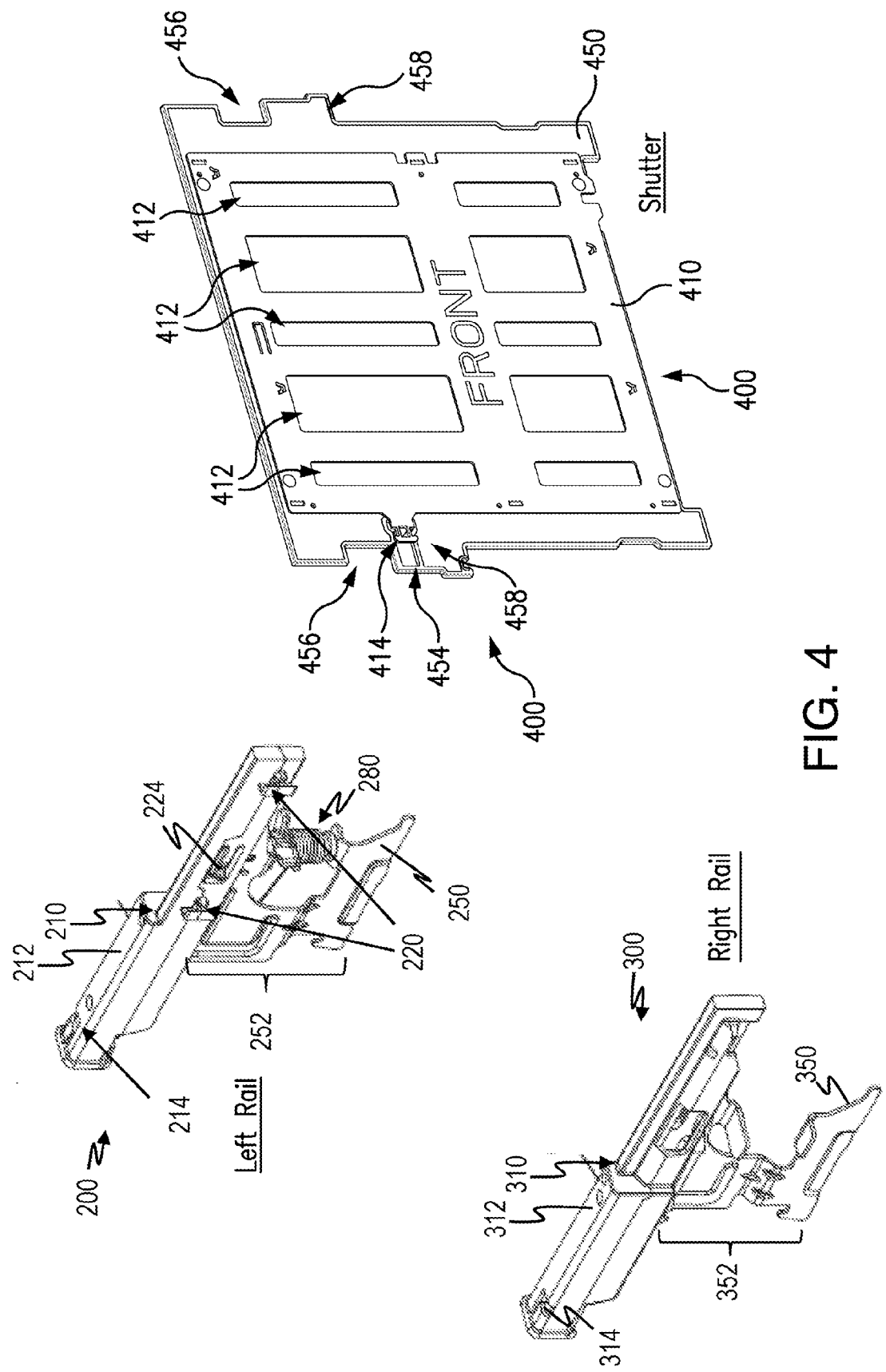

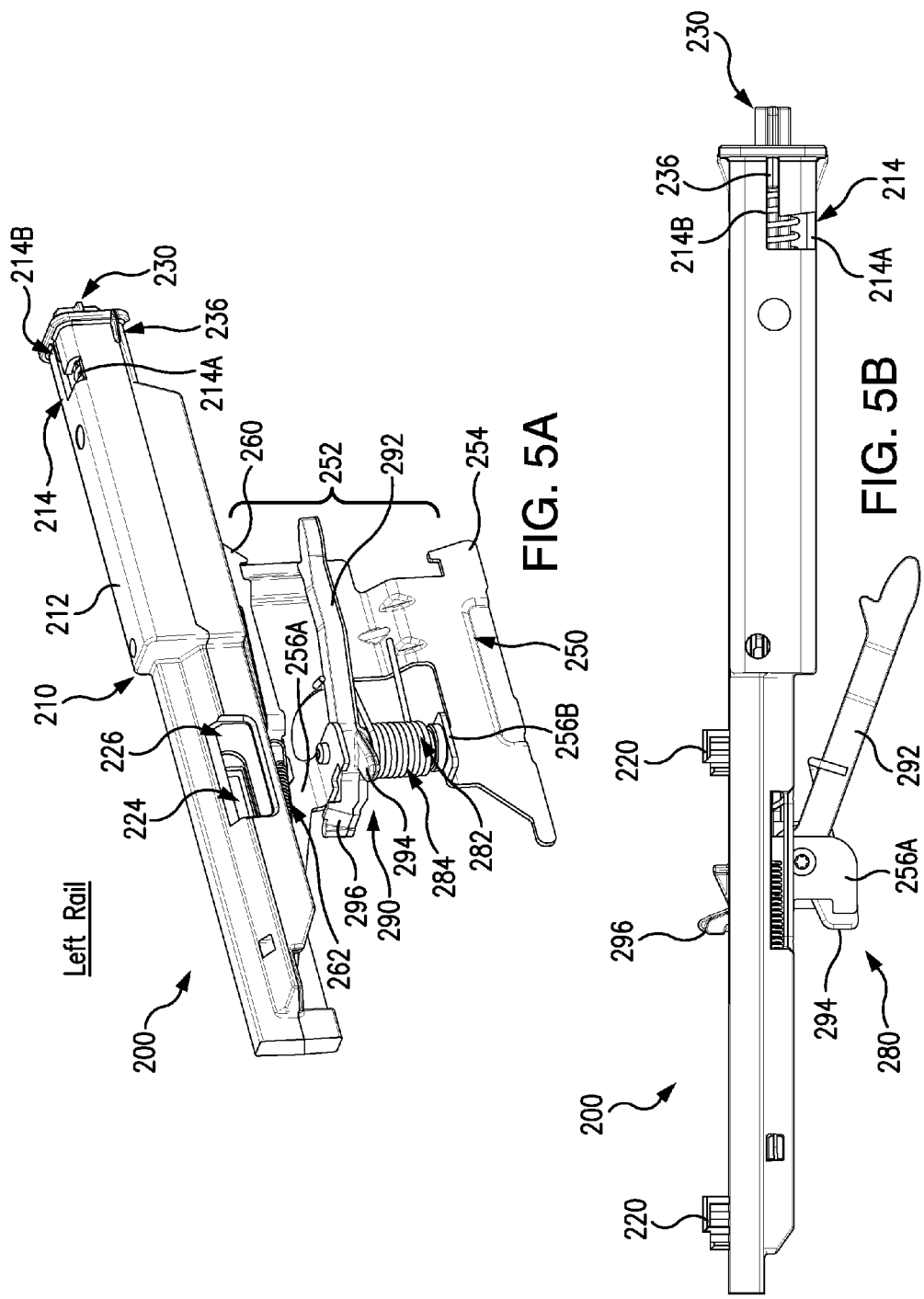

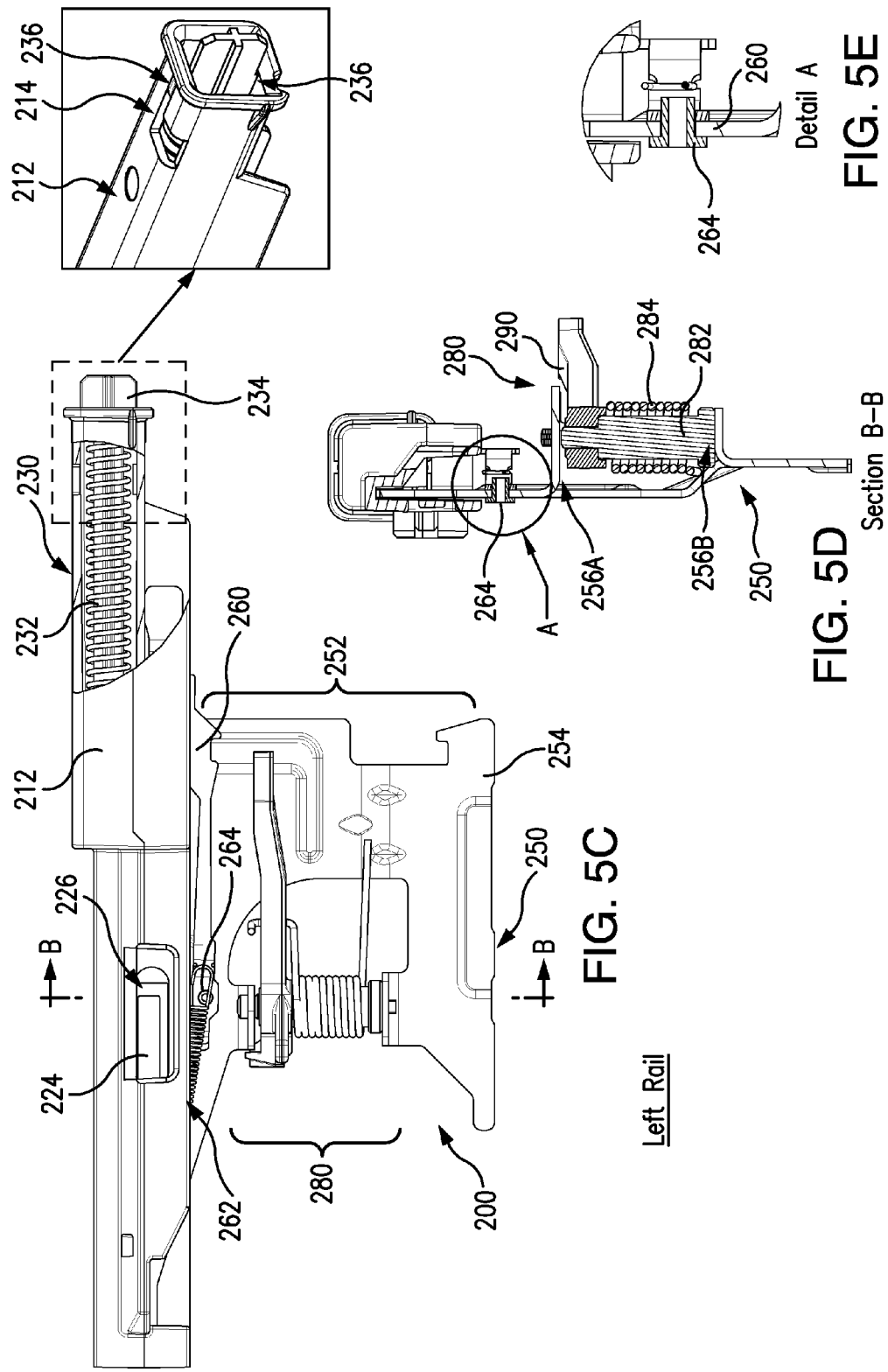

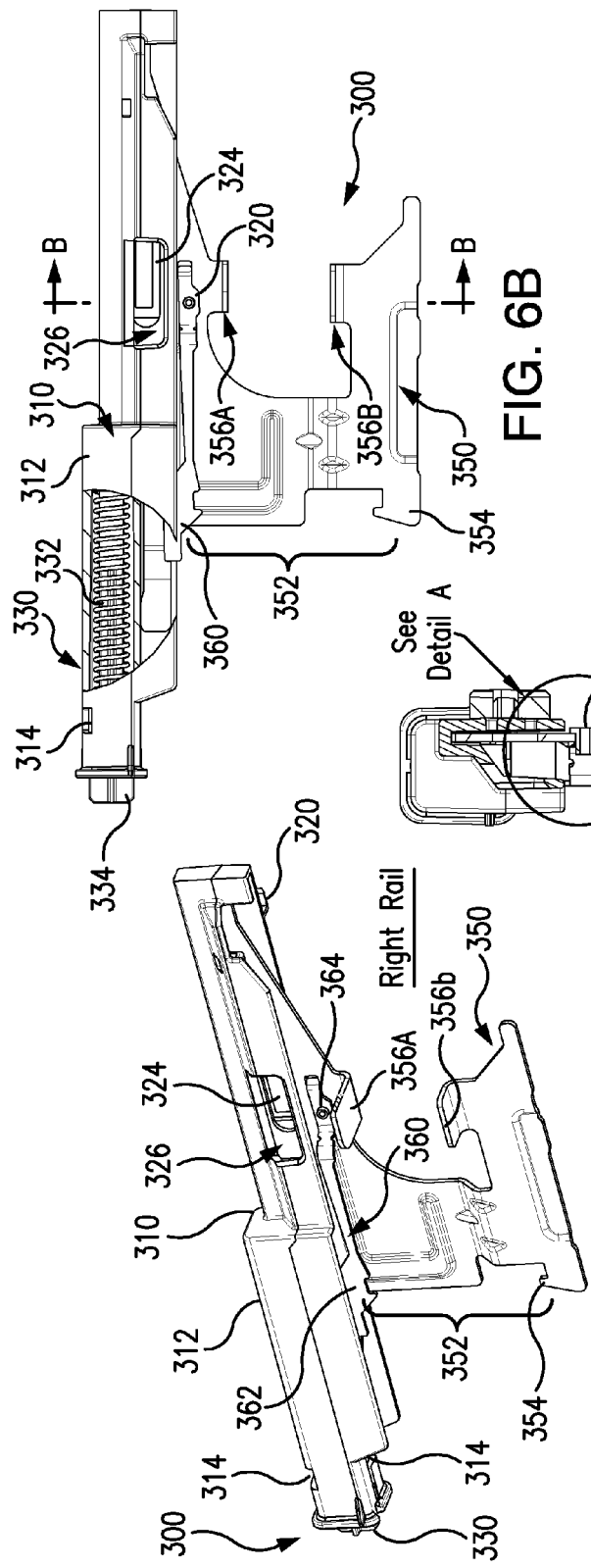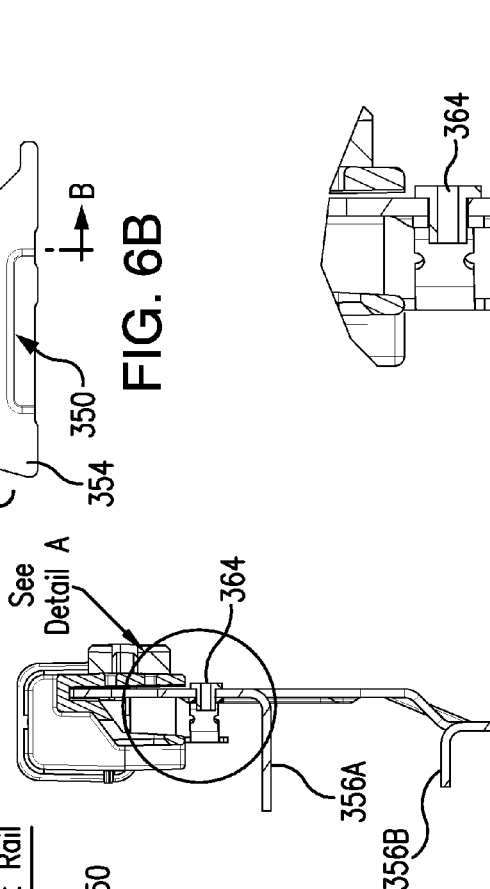

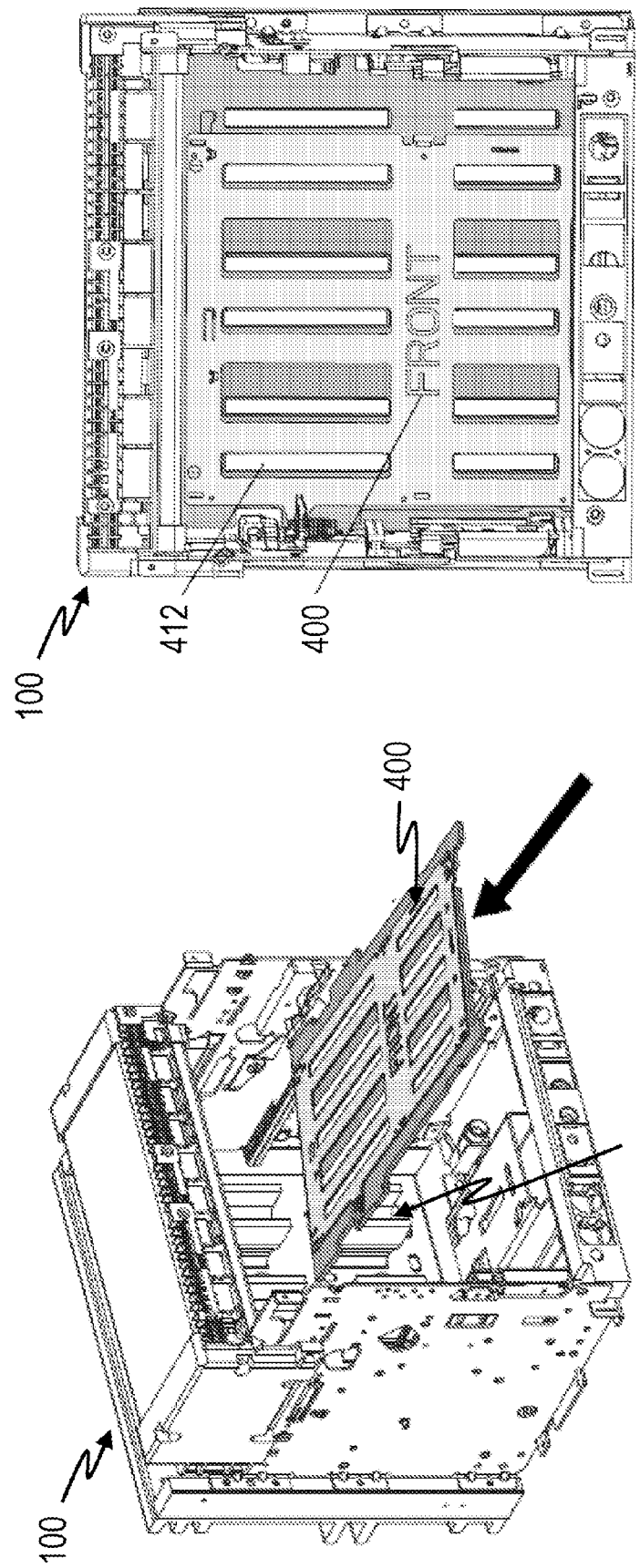

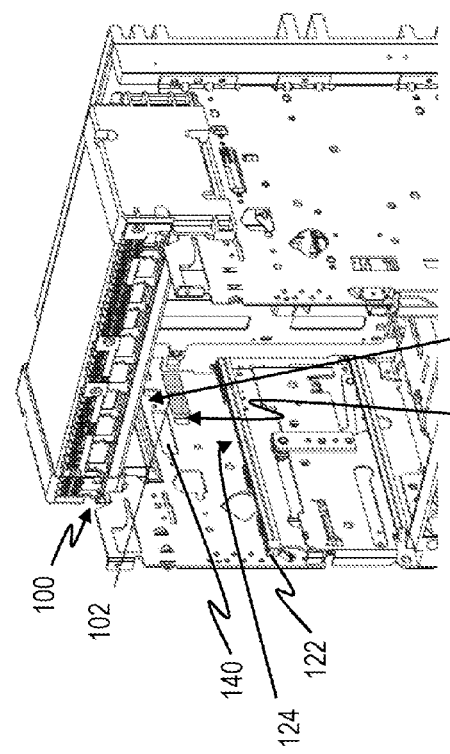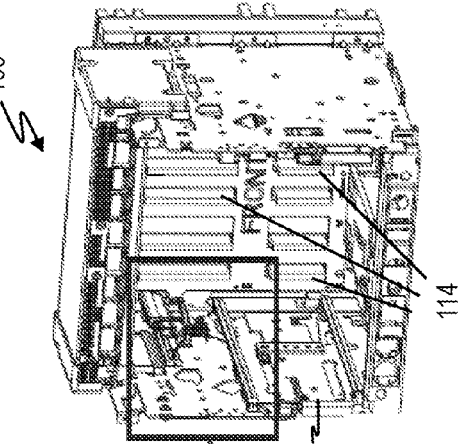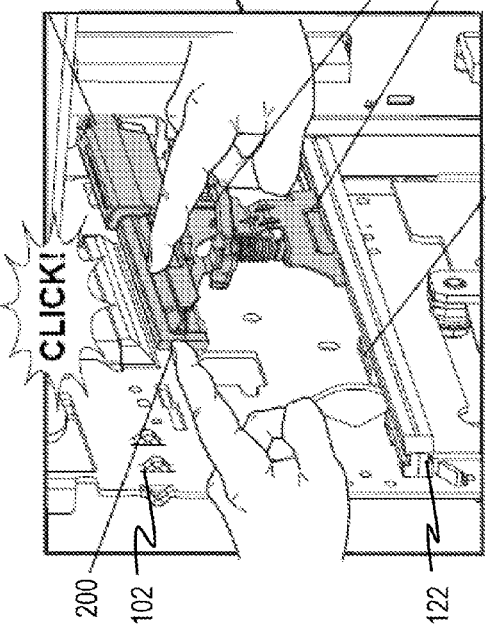

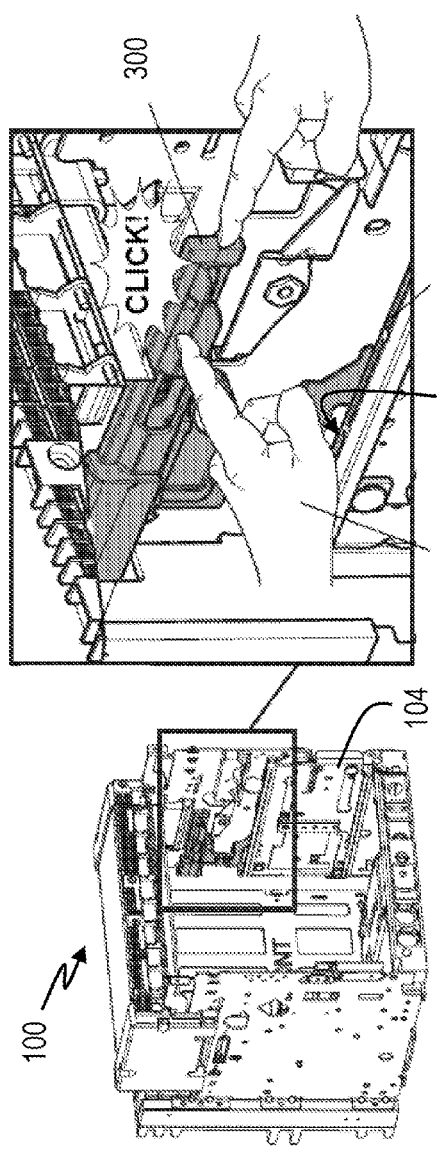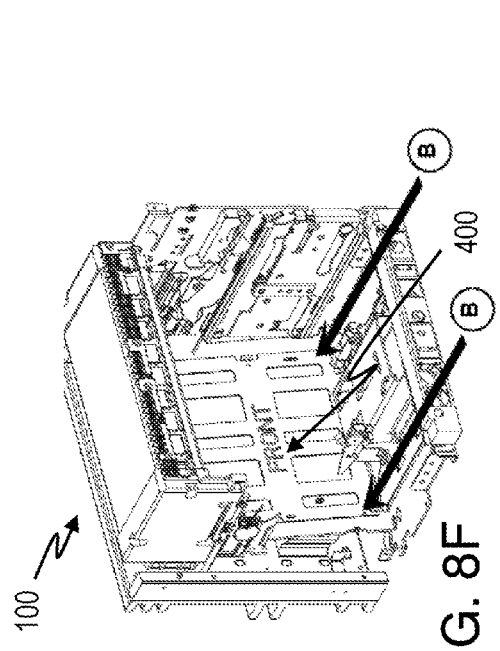

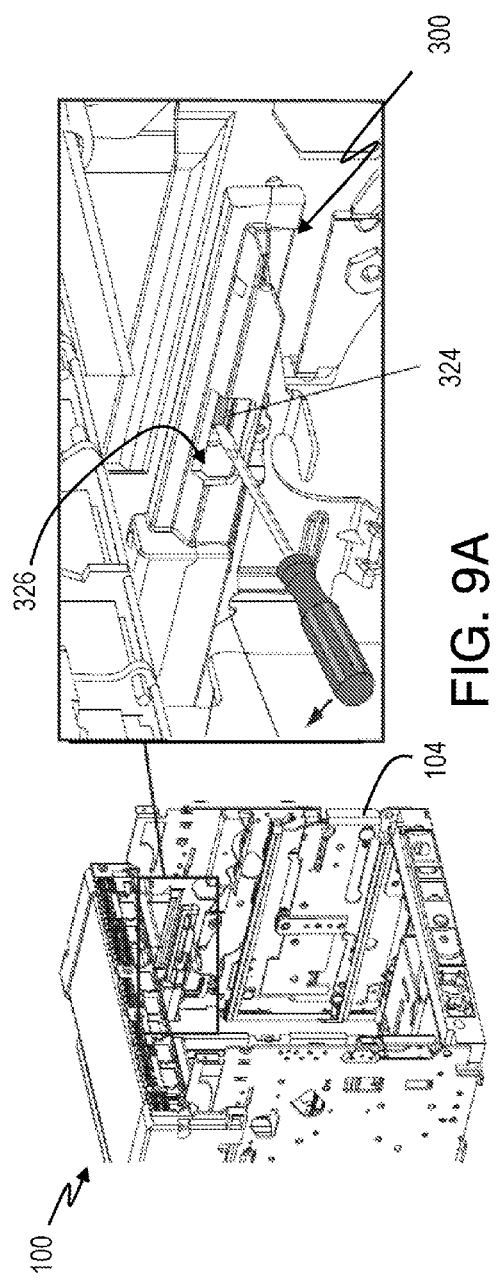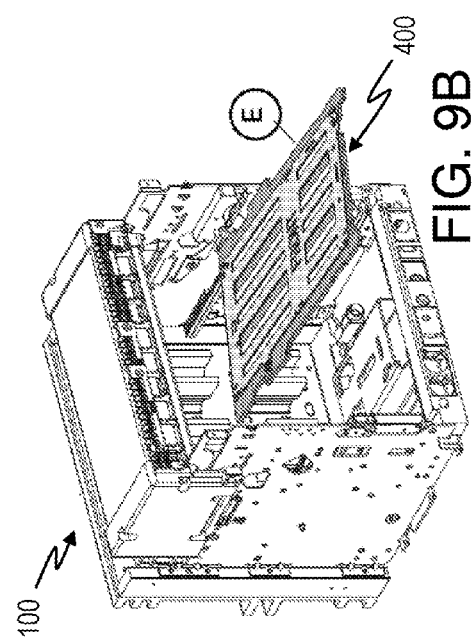

SNAP-IN SHUTTER SYSTEM FOR RACK OUT CIRCUIT BREAKERS

FIELD

The present disclosure relates to the field of switching equipment, and more particularly, to a snap-in shutter system for rack out circuit breakers.

BACKGROUND

A circuit breaker system is often employed in a switchgear system, and can be a rack out circuit breaker system (also referred to as a drawout or draw out circuit breaker system), in which the circuit breaker is racked in or out without having to remove connections or mounting supports. The rack out circuit breaker system includes a circuit breaker and a supporting structure, such as a cradle, which is mounted in a compartment of the switchgear.

The cradle houses the breaker and includes various components, such as electrical connectors (e.g., primary connectors) and a shutter system. The shutter system protects an operator or technician from contacting the electrical buses at a back of the cradle, which the connectors of the breaker are engaged to. The shutter of the assembly is arranged in front of the buses, and operates between an open position in which the shutter is opened to expose the bus to the breaker connectors when racking in a circuit breaker, and a closed position in which the shutter is closed to restrict access to the buses when racking out the circuit breaker. Presently, a shutter system is pre-assembled as part of the cradle and secured using fastening devices (e.g., bolts and screws). Thus, the installation or removal of the shutter system requires significant time and effort, and involves many loose components and the use of tools. Further, the shutter system typically cannot be installed or removed without having to disconnect the cradle or chassis from equipment, such as the switchgear.

SUMMARY

The present disclosure provides a shutter system for a cradle of a rack out circuit breaker, which includes two rail assemblies, a shutter and a cam actuator. A first of the rail assemblies is configured to snap into an interior surface of a side wall of the cradle, and a second of the rail assemblies is configured to snap into an interior surface of an opposing side wall of the cradle. Each rail assembly includes a snap-in lock assembly and a slider movable between a front and back of the cradle along a corresponding side wall. The lock assembly includes a tab configured to engage an opening in a side wall of the cradle, and a spring guide, at an end of the rail assembly, which is configured to exert a force against a back wall of the cradle to lock the rail assembly along the side wall when the tab is engaged in the opening. The shutter is connected to and between the sliders. The shutter is configured to move with the sliders toward the back of the cradle and into an open position which allows access to buses at the back of the cradle when racking in the circuit breaker. The shutter is also configured to move with the sliders away from the back of the cradle and into a closed position which restricts access to the buses at the back of the cradle when racking out the circuit breaker. The cam actuator is arranged on the first rail assembly or the second rail assembly. The cam actuator is configured to cause the shutter to move to the open position when racking in the circuit breaker, and to the closed position when racking out the circuit breaker. Furthermore, when the shutter is in the closed position, polarization force is applied by a compression spring of the spring guide on the rail assemblies, and the loading shifts from the rail assemblies to the back wall when racking in the circuit breaker. The disclosed shutter system can be easily and quickly installed in a cradle. Furthermore, the installation or removal of the disclosed shutter system can be performed through the front of the cradle, and without having to remove the cradle or chassis from the switchgear. The disclosed shutter system also does not include any loose parts, which may drop inside the enclosure and cause arcing.

In a further embodiment, each of the rail assemblies can include a clip assembly, mounted on the slider of the rail and configured to clip onto a side portion of the shutter. The clip assembly also makes installation and removal of the shutter system easier. The cam actuator can also include a retainer having a shaft and a cam body connected to rotate on the shaft. The cam body can include three legs, such as a first, second and third leg. The first leg is configured to cause the shutter to move between the open position and the closed position. The second leg is configured to cam against a portion of the circuit breaker when moved toward the back of the cradle, thereby causing the cam body to rotate and the first leg to move the shutter to the open position. The third leg is configured to cam against an interior surface of an opening in one of the side walls when the circuit breaker is moved toward the back of the cradle, which also causes the cam body to rotate so that the first leg moves the shutter to the open position. The cam actuator also includes a torsion spring, mounted on the shaft of the retainer, which applies a force to the cam body. The force of the torsion spring causes the first leg to move the shutter to the closed position when the circuit breaker is withdrawn or absent from the cradle.

BRIEF DESCRIPTION OF THE DRAWINGS

The description of the various exemplary embodiments is explained in conjunction with the appended drawings, in which:

FIG. 4 illustrates a further perspective view of the left rail assembly, right rail assembly and shutter of the shutter system of FIG. 1;

FIGS. 5A through 5E illustrate various perspective views (including partial views) of the left rail assembly of the shutter system of FIG. 1;

FIGS. 6A through 6D illustrate various perspective views (including partial views) of the right rail assembly of the shutter system of FIG. 1;

FIGS. 8A through 8F illustrate exemplary operations of installing the shutter system of FIG. 1 into the cradle;

FIGS. 9A and 9B illustrate exemplary operations of uninstalling the shutter system of FIG. 1 from the cradle;

DETAILED DESCRIPTION

Figure 1:
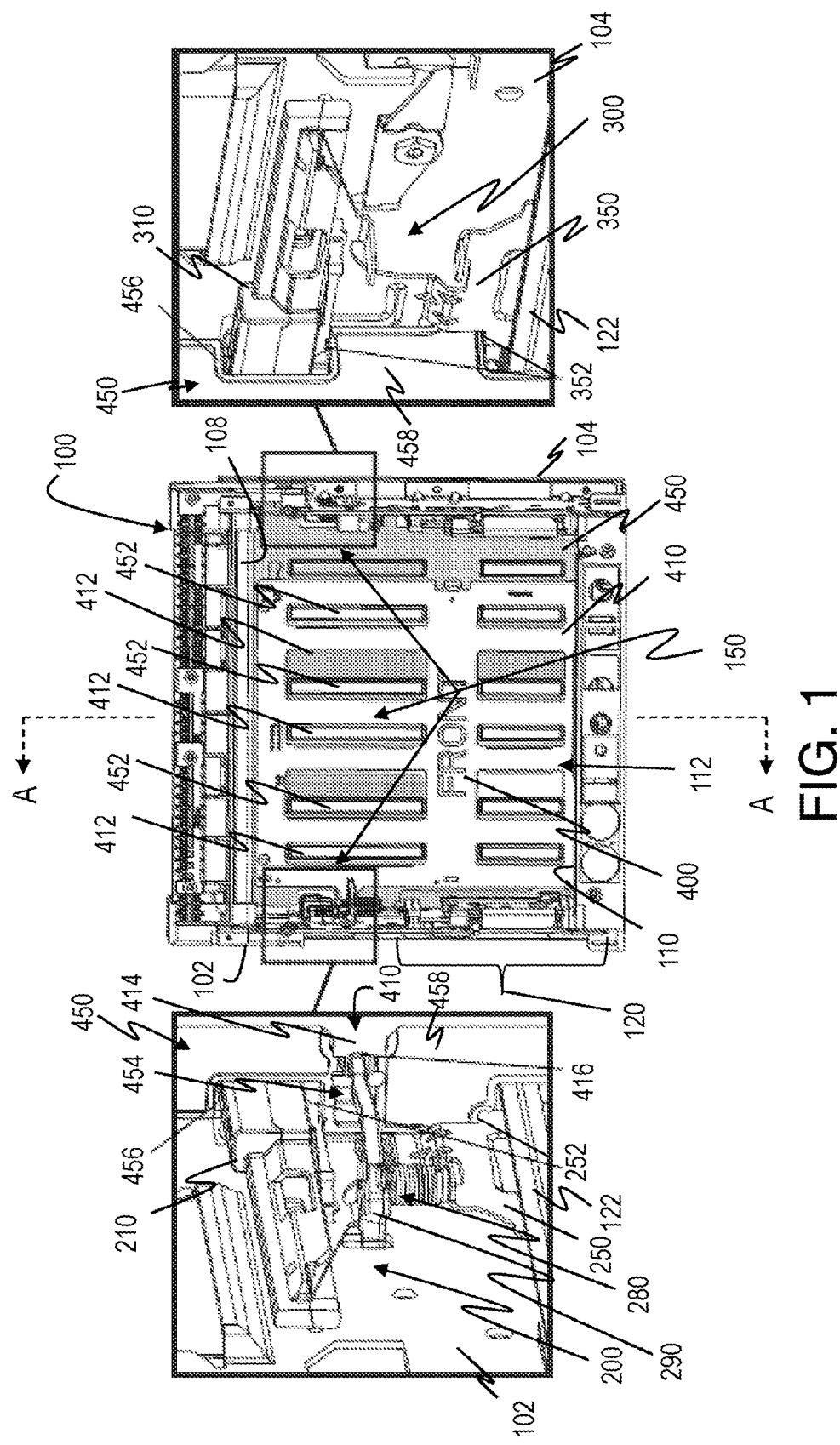
FIG. 1 illustrates a front perspective view of a rack out breaker cradle with a snap-in shutter system, with exploded views of the left and right rail assemblies of the shutter system, in accordance with a first embodiment of the present disclosure.
Figure 3:
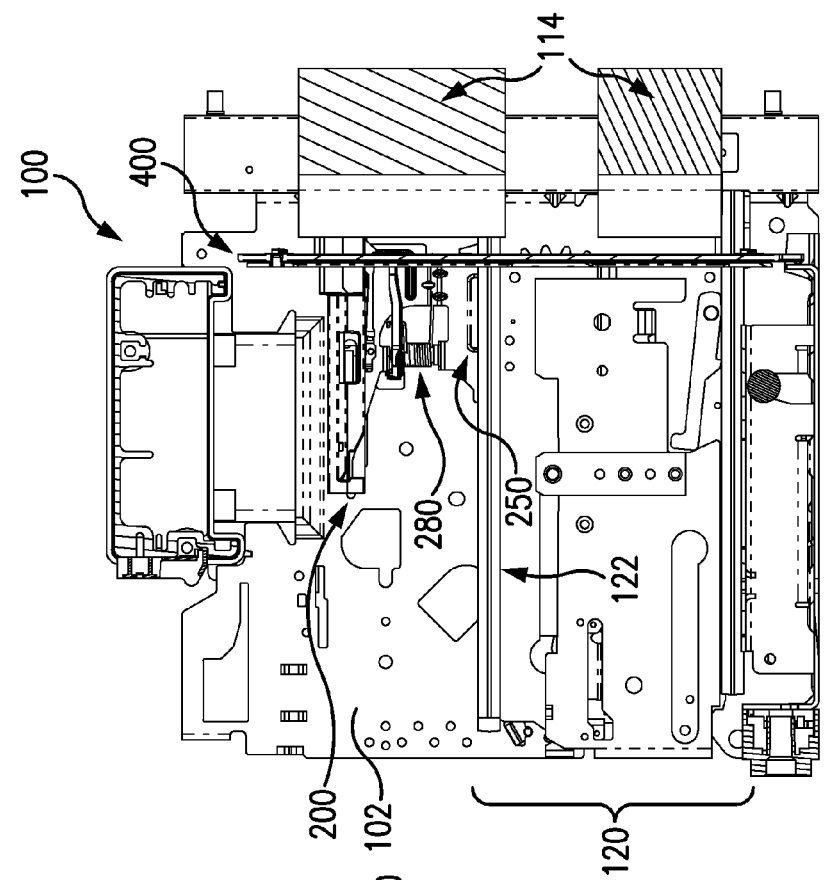
FIG. 3 illustrates a cross-sectional view of the cradle of FIG. 1 with the rail assemblies engaged along a side wall, in this example, the left side wall, of the cradle.
Figure 2:
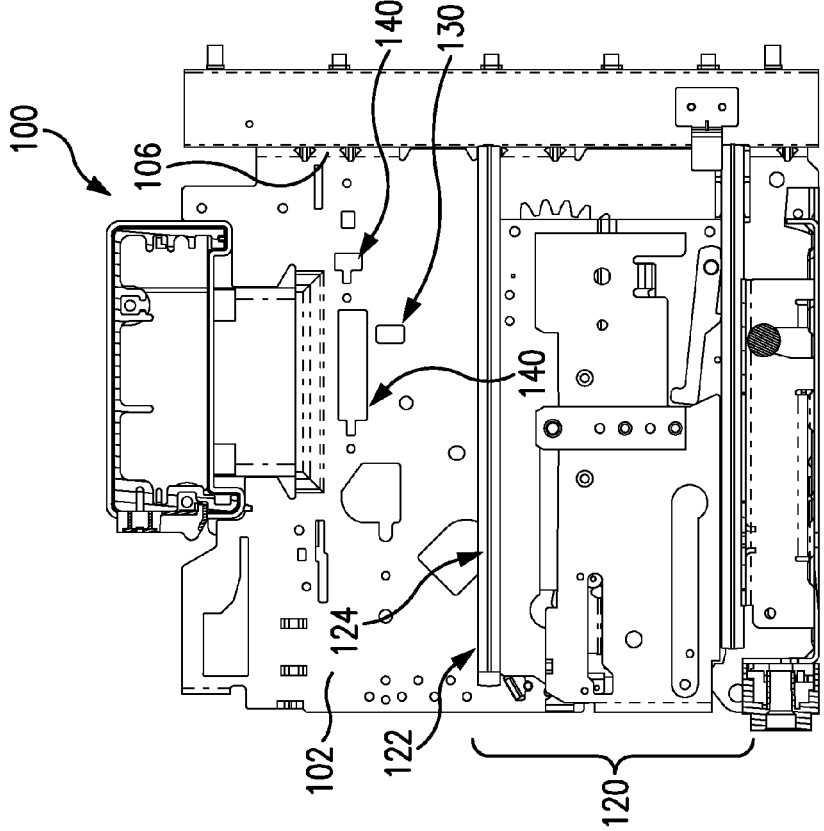
FIG. 2 illustrates a cross-sectional view of the cradle of FIG. 1 without the rail assembly engaged along a side, in this example, the left side wall, of the cradle.

FIG. 1 illustrates perspective view of a circuit breaker cradle (or "cradle") 100 and a snap-in shutter system 150 arranged in the cradle. The cradle 100 includes a plurality of walls that form a housing for a rack out circuit breaker, and a racking system 120 for racking in and out a circuit breaker. As shown in FIG. 1, the cradle 100 includes two opposing side walls, such as a left side wall 102 and a right side wall 104. The cradle 100 also includes a top wall 108, a bottom wall 110 and a front opening 112 through which to rack in or rack out a circuit breaker. FIGS. 2 and 3 show the left side wall 102 of the cradle 100 without and with, respectively, the shutter system 150. As shown in FIG. 2, the cradle 100 also includes a back wall 106, and a plurality of buses 114 connectable to a power supply and to a load(s). The left side wall 102 includes openings 130 and 140, and a top racking rail 122 of the racking system 120. The top racking rail 122 includes a top slot or groove 124. Although not shown, the right side wall 104 also includes openings 130 and 140, and a top racking rail 122 with a top slot or groove 124 of the racking system 120.

Turning back to FIG. 1, the shutter system 150 includes two rail assemblies, such as a left rail assembly 200 and a right rail assembly 300, which are engaged along the left side wall 102 and the right side wall 104, respectively. Each of the rail assemblies 200 and 300 include a snap-in lock assembly, which is configured to engage corresponding opening(s) 140 on the left side wall 102 and the right side wall 104, respectively. When engaged to a side wall, the snap-in lock assembly for each rail 200 or 300 applies a polarizing force between a corresponding side wall (102 or 104) and the back wall 106 to secure the rail along the side wall of the cradle 100.

The left rail assembly 200 includes a body 210 and a slider 250 movably mounted to the body 210. The right rail assembly 300 also includes a body 310 and a slider 350 movably mounted to the body 310. The shutter system 150 includes a shutter 400, which is connected to and between the slider 250 of the left rail assembly 200 and the slider 350 of the right rail assembly 300. The shutter 400 is able to move along with the sliders 250 and 350, between the front and back of the cradle 100. In this example, a cam actuator 280 is arranged on the left rail assembly 200 and drives the shutter 400 to an open position to expose or allow access to the buses 114 at the back of the cradle 100 when racking in a circuit breaker or to a closed position to cover or restrict access to the buses 114 when racking out a circuit breaker.

The shutter 400 moves together with the sliders 250 and 350 toward the back of the cradle 100 when racking in a circuit breaker, and away from the back of the cradle 100 when racking out a circuit breaker. The shutter 400 includes two shutter frames, namely a front shutter frame 410 and a back shutter frame 450. The shutter frame 410 includes a plurality of openings 412, and the shutter frame 450 includes a plurality of openings 452. The shutter frames 410 and 450 are movably connected to each other and move between the open position and the closed position. For example, the shutter frames 410 and 450 can be connected by snapping them together using a combination of posts and corresponding slots, which allow one shutter frame to move in relation to the other shutter frame. When the shutter 400 is in the open position (as shown in FIG. 1), the openings 412 of the shutter frame 410 align with corresponding openings 452 of the shutter frame 450 (or vice-a-versa) to expose or allow access to the buses 114 through the shutter 400 so that electrical connectors from the circuit breaker can engage and connect to the buses 114. When the shutter 400 is in the closed position, the openings 452 of the shutter frame 450 are covered by the shutter frame 410 to restrict access to the buses 114.

In this example, the shutter frame 450 is fixed, and the shutter frame 410 is movably connected to the shutter frame 450. The shutter frame 450 includes two grooves 456 on opposite sides of the shutter frame. Each of the grooves 256 allows a portion of a body 210 or 310 of a corresponding rail 200 or 300, respectively, to pass through the grooves 456, when the shutter system 150 is assembled into the cradle 100. The shutter frame 450 also includes two extending side portions 458 also on opposite sides of the shutter frame, arranged below corresponding grooves 456. The extending side portion 458 on each side of the shutter frame 450 is engaged to a corresponding clip assembly (also referred to as a "clip") 252 of the slider 250 or a clip 352 of the slider 350.

As shown in the enlarged view of the left rail assembly 200 in FIG. 1, the shutter frame 400 includes a tab 414 that has a slot 416. The shutter frame 450 includes a slot 454. The tab 414 of the shutter frame 400 is movably connected in the slot 450 of the shutter frame 450. The size and shape of the slot 454 defines the range of motion of the shutter frame 410 (e.g., the slot acts as a stop) in relation to the fixed shutter frame 450.

The cam actuator 280 includes a rotatable cam body 290, which includes two cam surfaces and a leg that is engaged in the slot 416 of the shutter frame 410 to drive the shutter 400 between the open position and the closed position. The cam actuator 280 also includes a torsion spring, which applies a force to the cam body 490 to keep the shutter 400 in the closed position, when a circuit breaker is racked out of or is not present in the cradle 100. The cam actuator 280 will be described in greater detail below with reference to FIGS. 5A and 5B.

FIG. 4 illustrates a perspective view of the left rail assembly 200, right rail assembly 300 and shutter 400 of the shutter system 150 of FIG. 1. As shown in FIG. 4, the left rail assembly 200 includes the body 210 and the slider 250 which is movably connected at the bottom of the body 210 and slides along a length or longitudinal axis of the body 210. The body 210 of the left rail assembly 200 includes retention tabs 220 and a resilient locking tab 224, which are spaced apart along a length or longitudinal axis of the body. The retention tabs 220 and the resilient locking tab 224 are configured to engage corresponding openings 140 on the left side wall 102. In this example, the retention tabs 220 have a shape that coordinates with corresponding features in the cradle side wall.

FIGS. 5A through 5E illustrate additional views of the left rail assembly 200 of the shutter system 150 of FIG. 1. As shown in FIG. 5A, the body 210 of the left rail assembly 200 includes an opening 226 to access the resilient locking tab 224 when engaged to the left side wall 102. The body 210 also includes a barrel 212 on one end of the body. The barrel 212 houses a spring guide 230. The barrel 212 includes an L-shaped groove 214 on a top end and an opposing bottom end (not shown) of the barrel 212. The spring guide 230 includes an end portion having a pair of extending self-locking tabs 236. Each L-shaped groove 214 is configured to receive a corresponding self-locking tab 236. When assembling the spring guide 230 into the barrel 212, the spring guide 230 can be inserted into an open end of the barrel 212 with the self-locking tabs 236 oriented diagonally at an angle until the self-locking tab 236 engages a portion 214A of the groove 214. In this example, the barrel 212 has a square or rectangular cross-section to provide sufficient clearance to allow the self-locking tab 236 to be inserted diagonally into the barrel 212. The self-locking tab 236 can then be moved into and along a longitudinal portion 214B of the groove 214 to lock and guide, respectively, the spring guide 230 in the barrel 212.

The slider 250 of the left rail assembly 200 includes a pair of support brackets 256A and 256B for the cam actuator 280. The cam actuator 280 includes a retainer 282 having a shaft, a cam body 290 connected to rotate on the shaft of the retainer 282, and a torsion spring mounted on the shaft of the retainer 282. The cam body 290 includes a first leg 292, a second leg 294 and a third leg 296. The first leg 292 has an end portion configured to engage the slot 416 of the shutter 400 and to control movement of the shutter 400 between the open position and the closed position. The second leg 294 has an end portion (e.g., a cam surface) configured to cam against a portion of a circuit breaker when the circuit breaker is moved toward the back of the cradle 100 (e.g., when racking in the circuit breaker), thereby causing the cam body 290 to rotate and the first leg 292 to move the shutter 400 to the open position. The third leg 296 has an end portion which provides a second cam surface which is configured to cam against an interior surface of the opening 130 in the left side wall 102, when the circuit breaker is racked into the cradle 100. Accordingly, in this example, the cam actuator 280 is a dual cam actuator with two cam surfaces. The torsion spring 284 is configured to apply a force to the cam body 290, which causes the first leg 292 to move the shutter 400 to the closed position when a circuit breaker is withdrawn or absent from the cradle 100.

The left rail assembly 200 also includes the clip 252. The clip 252 includes a top arm 260 which is connected to a top portion of the slider 250, via a fastener (e.g., fastener 264 shown in FIGS. 5C and 5D), and a bottom arm 254 formed from a bottom portion of the slider 250. The clip 252 is used to hold a corresponding extending side portion 458 of the shutter 400. In this example, the top arm 260 is attached to an extension spring 262, which is used to apply a counter force to counteract forces applied to the cam actuator 280 during a rack in operation of a circuit breaker. An extension spring 262 may also be incorporated into the right rail assembly 300. FIG. 5B is top view of the components of the left rail assembly 200, and provides another view of the retention tabs 220 and the arms 292, 294 and 296 of the cam actuator 280. FIG. 5B also provides another view of the L-shaped groove 214 on the barrel 212, which houses the spring guide 230.

FIG. 5C illustrates a side view of the components of the left rail assembly 200, with a cut-out view of the barrel 212. As shown in FIG. 5C, the spring guide 230 includes a compression spring 232 and a guide 234. The guide 234 has an end portion that includes a pair of the self-locking tabs 236 engaged in corresponding L-shaped grooves 214 on a top and bottom end of the barrel 212. FIG. 5C also shows a clearer view of the extension spring 262, and the fastener 264 which connects the top arm 260 of the clip 252 to the slider 250. FIG. 5D illustrates a cross-sectional view of the components of the left rail assembly 200, and provides another view of the assembly for the cam actuator 280. FIG. 5E illustrates in greater detail the connection of the top arm 260 of the clip 252 to the slider 250, via the fastener 264.

FIGS. 6A through 6D illustrate various perspective views of the right rail assembly 300 of the shutter system 150 of FIG. 1. The right rail assembly 300 may include the same components and features as the left rail assembly 200, except that the right rail assembly 300 is oriented to engage the right side wall 104. For example, as shown in FIG. 6A, the body 310 of the right rail assembly 300 includes retention tab(s) 320 (partially shown) to be engaged to corresponding openings 140 of the right side wall 104. In this example, the retention tabs 320 have a shape that coordinates with corresponding features in the cradle side wall. The body 310 may also include an opening 326 to access a resilient locking tab 324 when engaged to one of the openings 140 on the right side wall 104. The retention tabs 320 and the resilient locking tab 324 are spaced apart along a longitudinal axis or length of the body. Furthermore, the body 310 includes a barrel 312 on one end of the body. The barrel 312 houses a spring guide 330. The barrel 312 includes an L-shaped groove 314 on a top end and an opposing bottom end of the barrel 312. As with the left rail assembly 200, the spring guide 330 includes an end portion having a pair of extending self-locking tabs. Each L-shaped groove 314 is configured to receive a corresponding self-locking tab. When assembling the spring guide 330 into the barrel 312, the spring guide 330 can be inserted into an open end of the barrel 312 with the self-locking tabs oriented diagonally at an angle until the self-locking tab engages a side portion of the groove 314. The self-locking tab can then be moved into and along a longitudinal portion of the groove 314 to lock and guide, respectively, the spring guide 330 in the barrel 312.

The slider 350 of the right rail assembly 300 may also include a pair of support brackets 356A and 356B for a cam actuator. The right rail assembly 300 also includes the clip 352 on the slider 350. The clip 352 includes a top arm 360 which is connected to a top portion of the slider 350, via a fastener (e.g., fastener 364 in FIGS. 6C and 6D), and a bottom arm 354 formed from a bottom portion of the slider 350. The clip 352 is used to hold a corresponding extending side portion 458 of the shutter 400.

FIG. 6B illustrates a side view of the components of the right rail assembly 300, with a cut-out view of the barrel 312. As shown in FIG. 6B, the spring guide 330 includes a compression spring 332 and a guide 334. As with the left rail assembly 200, the guide 334 of the right rail assembly 300 has an end portion that includes a pair of the self-locking tabs (not shown) engaged in corresponding L-shaped grooves 314 on a top and bottom end of the barrel 312. FIG. 6C illustrates a cross-sectional view of the components of the right rail assembly 300. FIG. 6D illustrates in greater detail the connection of the top arm 360 of the clip 352 to the slider 350, via the fastener 364.

Figure 7B:
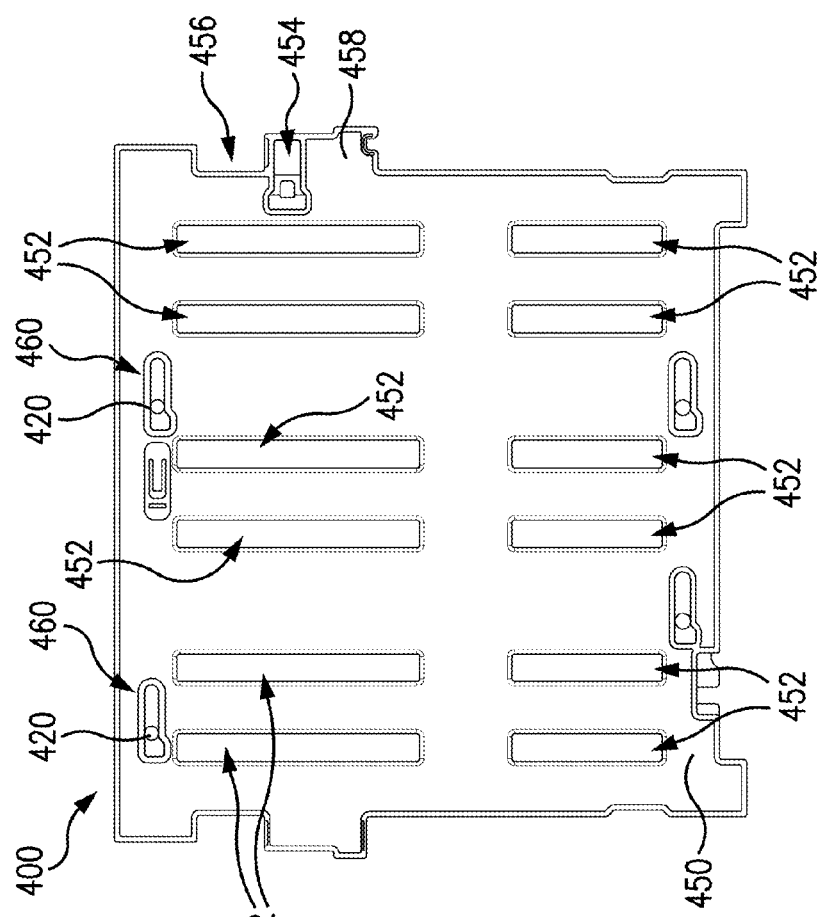
FIGS. 7A and 7B illustrate a front view and a back view of the shutter of the shutter system of FIG. 1.
Figure 7A:
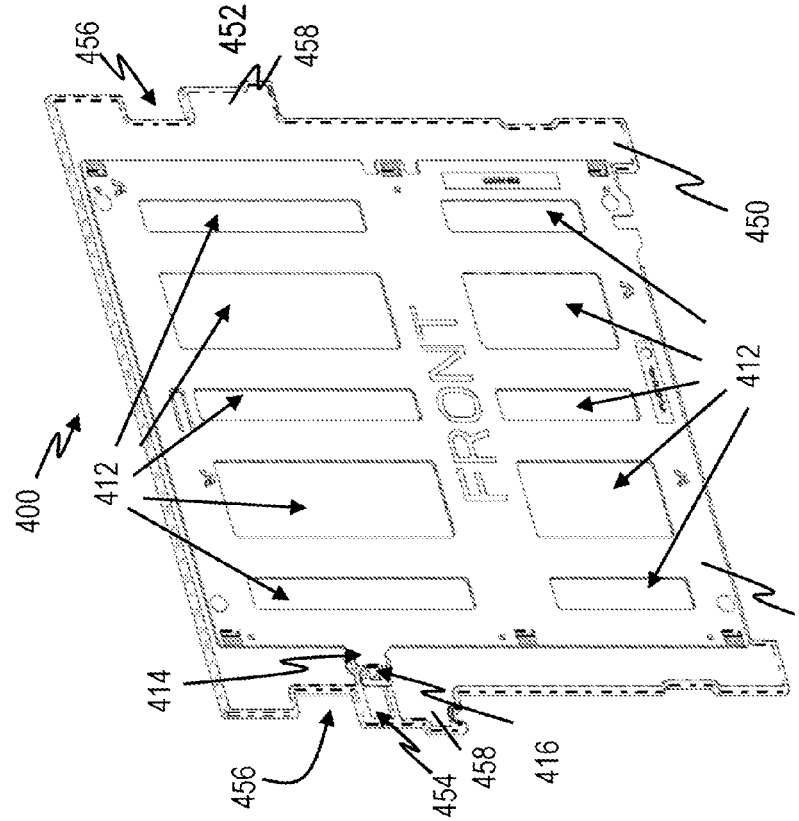

FIGS. 7A and 7B illustrate a front view and a back view, respectively, of the shutter 400 of the shutter system 150 of FIG. 1. As shown in FIG. 7A, the shutter 400 includes the movable shutter frame 410 with openings 412. The shutter 400 also includes the fixed shutter frame 450 with openings 452, as shown in FIG. 7B. As further shown in FIG. 7B, the shutter frame 410 may include a plurality of posts 420 which can be snapped into corresponding slots 460 of the shutter frame 450 so that the posts 420 are movably engaged in the slots 460.

The shutter system 150, as discussed above, is provided as an example. The components of the shutter system 150 can be modified or changed. For example, the cam actuator can be arranged on the right rail assembly 300, with the shutter 400 having the slot 454, the tab 414 and the slot 416 arranged on the opposite side adjacent to the right side wall 104. The shutter 400 can also have the fixed shutter frame in the front and the movable shutter frame on the back with variations as to the slots, tabs, and openings. The components of the shutter system 150 can also be made of a dielectric material or a metal. Furthermore, the various components can be movably fastened together using a combination of any suitable configuration, such as tab and grooves/openings, posts and slots, and so forth. In addition, the shutter 400 is a modular assembly that may be configured for any number of poles, and can be easily modified to switch from 3-pole to 6-pole, 4-pole to 8-pole, or so forth by switching out the movable shutter frame 410 to one which has the desired pole configuration.

Figure 10:
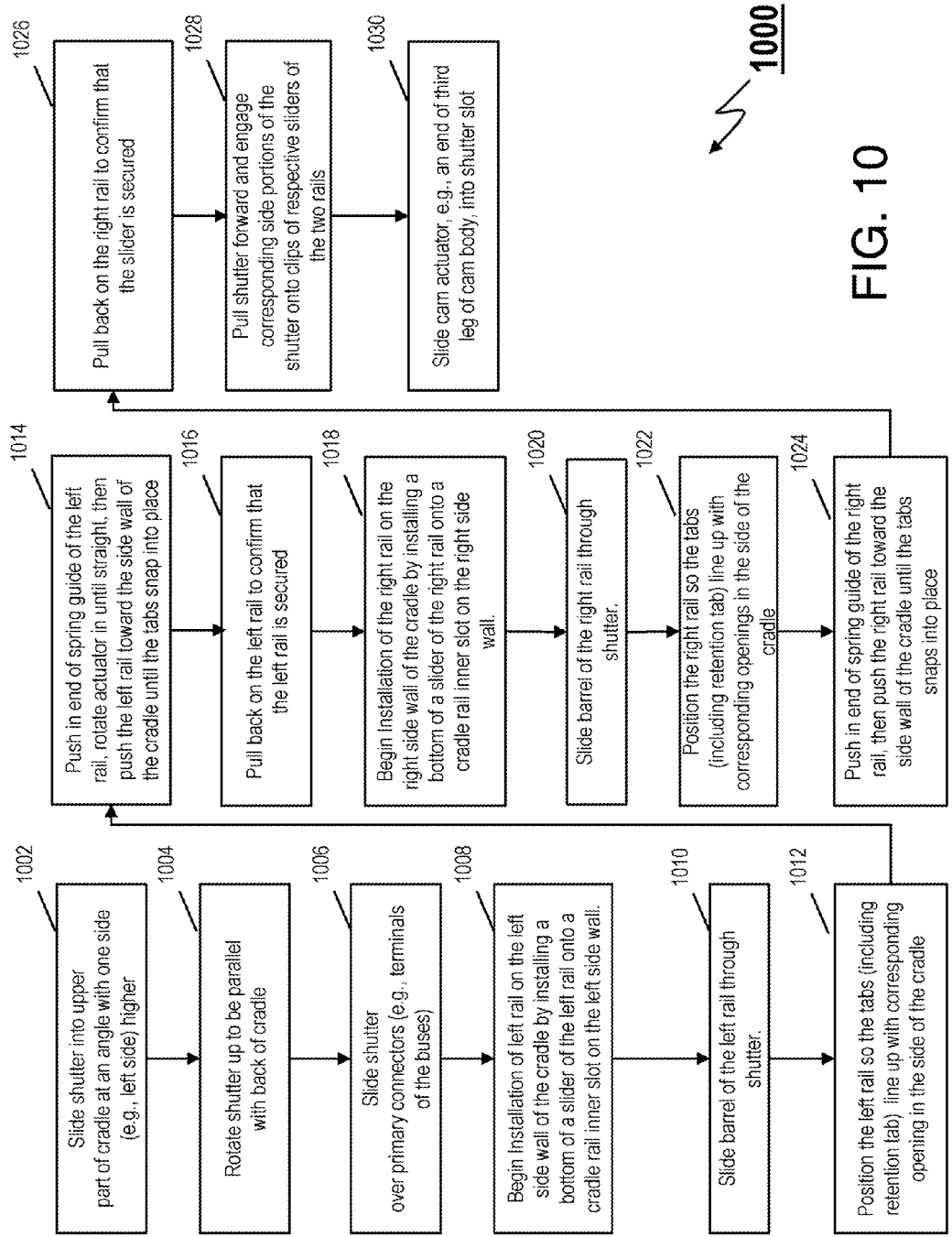
FIG. 10 illustrates an exemplary process for installing a snap-in shutter system of FIG. 1 into the cradle.

FIG. 10 illustrates an exemplary process 1000 for installing the shutter system 150 into the circuit breaker cradle 100 of FIG. 1. The process 100 will be described with reference to FIGS. 8A through 8E.

At reference 1002, the shutter 400 of the shutter system 150 is slid into an upper part of the cradle 100 at an angle with one side, such as the left side, higher as shown in FIG. 8A. The shutter 400 is rotated up so as to be parallel with the back of the cradle 100 as shown in FIG. 8B, at reference 1004. The shutter 400 is then slid over the terminals of the buses 114 in the back of the cradle 100, at reference 1006.

Next, the left rail assembly 200 of the shutter system 150 is installed onto and along the left side wall 102 of the cradle 100. For example, at reference 1008, the left rail assembly 200 has the bottom of the slider 250 installed onto the top slot or groove 124 of the racking rail 122 of the racking system 120 on the left side wall 102. The barrel 212 of the left rail assembly 200 is slid through the shutter 400, such as through the groove 456 on the side of the shutter 400 adjacent to the left side wall 102, at reference 1010. At reference 1012, the left rail assembly 200 is positioned so that the retention tabs 220 and the resilient locking tab 224 are aligned with the openings 140 (shown in FIG. 8C), respectively, on the left side wall 102. At reference 1014, an end of the spring guide 230 is pushed back into the barrel 212 of the left rail assembly 200. The cam actuator 280 is rotated until straight. The left rail assembly 200 is then pushed toward the interior surface of the left side wall 102 of the cradle 100 until the retention tabs 220 and the resilient locking tab 224 snap into place. Once the tabs are engaged to the left side wall 102, the spring guide 230 applies a force against a back wall 106 of the cradle 100 so that the left rail assembly 200 is secured along the left side wall 102 by the retention tabs 220 and the spring guide 230 of the left rail, as shown in FIG. 8D. The resilient locking tab 224 provides an additional connection point to further secure the left rail assembly 200 onto the left side wall 102, e.g., to prevent inadvertent disassembly. At reference 1016, the left rail assembly 200 can be pulled back to confirm that the left rail assembly 200 is properly secured to the left side wall 102 of the cradle 100.

Next, the right rail assembly 300 of the shutter system 150 is installed onto and along the right side wall 104 of the cradle 100. For example, at reference 1018, the right rail assembly 300 has the bottom of the slider 350 installed onto the top slot or groove 124 of the racking rail 122 of the racking system 120 on the right side wall 104. The barrel 312 of the right rail assembly 300 is slid through the shutter 400, such as through a groove 456 on side of the shutter 400 adjacent to the right side wall 104, at reference 1020. At reference 1022, the right rail assembly 300 is positioned so that the retention tabs 320 and the retention tab 324 are aligned with openings 140 (shown in FIG. 8C), respectively, on the right side wall 104. At reference 1024, an end of the spring guide 330 is pushed back into the barrel 312 of the right rail assembly 300. The right rail assembly 300 is then pushed toward the interior surface of the right side wall 104 of the cradle 100 until the retention tabs 320 and the retention tab 324 snap into place. Once the tabs are engaged to the right side wall 104, the spring guide 330 applies a force against a back wall 106 of the cradle 100 so that the right rail assembly 300 is secured along the right side wall 104 by the retention tabs 320 and the spring guide 330 of the right rail, as shown in FIG. 8E. The retention tab 324 provides an additional connection point to further secure the right rail assembly 300 onto the right side wall 104, e.g., to prevent inadvertent disassembly. At reference 1026, the right rail assembly 300 can be pulled back to confirm that the right rail assembly 300 is properly secured to the right side wall 104 of the cradle 100.

At reference 1028, after both the left rail assembly 200 and the right rail assembly 300 are secured in the cradle 100, the shutter 400 can be pulled forward. The side portions 458 on opposite sides of the shutter 400 can be engaged onto corresponding clip 252 of the left rail assembly 200 and clip 352 of the right rail assembly 300. At reference 1030, the cam actuator 280 on the left rail assembly 200 can be engaged to the shutter system 100. For example, an end of the first leg 292 of the cam actuator 280 is engaged in the slot 416 of the shutter 400, as shown in FIG. 1.

Figure 11:
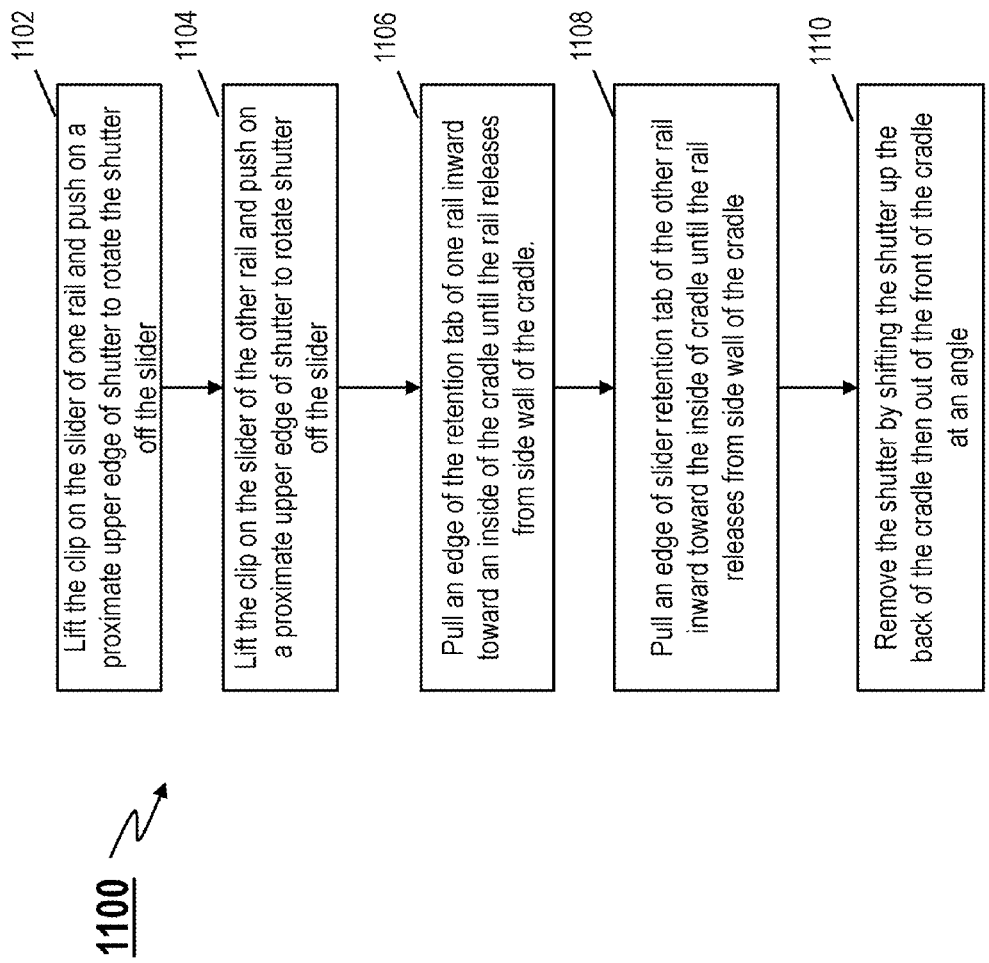
FIG. 11 illustrates an exemplary process for uninstalling or removing a snap-in shutter system of FIG. 1 from the cradle, such as in FIG. 1.

FIG. 11 illustrates an exemplary process 1100 for uninstalling or removing the shutter system 150 from the cradle 100 of FIG. 1. The process 1100 will be described with reference to FIGS. 9A through 9B.

At reference 1102, the clip on one of the sliders, such as the clip 352 of the slider 350 of the right rail assembly 300, can be lifted. A proximate upper edge of the shutter 400 is then rotated to disengage the side portion 458 from the clip 352. Similarly, at reference 1104, the clip on the other slider, such as the clip 252 of the slider 250 of the left rail assembly 200, can be lifted. A proximate upper edge of the shutter 400 is then rotated to disengage the other side portion 458 on the other side of the shutter 400 from the clip 252.

At reference 1106, the retention tab of one of the rail assemblies, such as retention tab 324 of the right rail assembly 300, is pulled inwards toward the inside of the cradle 100, via the opening 326, until the right rail assembly 300 is released from the right side wall 104. As shown in FIG. 9A, a tool can be used to pull the retention tab 324 inwards. Likewise, the retention tab of the other rail, such as resilient locking tab 224 of the left rail assembly 200, can also be pulled inwards toward the inside of the cradle 100, via the opening 226, until the left rail assembly 200 is released from the left side wall 102. Finally, the shutter 400 can be removed by shifting the shutter 400 up the back of the cradle 100 and then out of the front of the cradle 100 at an angle, as shown in FIG. 9B.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

The invention claimed is:

1. A shutter system for a cradle of a rack out circuit breaker comprising:

a first rail assembly configured to snap into an interior surface of a side wall of a cradle and a second rail assembly configured to snap into an interior surface of an opposing side wall of the cradle, each of the rail assemblies including:
a snap-in lock assembly having:
a tab configured to engage an opening in a side wall of the cradle, and
a spring guide, at an end of the rail, which is configured to exert a force against a back wall of the cradle to lock the rail along the side wall when the tab is engaged in the opening, and
a slider movable between a front and back of the cradle along the side wall;
a shutter connected to and between the sliders, the shutter being configured:
to move with the sliders toward the back of the cradle and into an open position which allows access to buses at the back of the cradle when racking in the circuit breaker, and
to move with the sliders away from the back of the cradle and into a closed position which restricts access to the buses at the back of the cradle when racking out the circuit breaker; and
a cam actuator, arranged on the first rail assembly or the second rail assembly, configured to cause the shutter to move to the open position when racking in the circuit breaker, and to the closed position when racking out the circuit breaker.

2. The system of claim 1, wherein each of the rail assemblies includes a plurality of the tabs spaced apart along a longitudinal axis and configured to engage corresponding openings on the side wall of the cradle.

3. The system of claim 1, wherein the cam actuator comprises:
a retainer having a shaft;
a cam body connected to rotate on the shaft, the cam body including:
a first leg configured to cause the shutter to move between the open position and the closed position, and
a second leg configured to cam against a portion of the circuit breaker when moved toward the back of the cradle, thereby causing the cam body to rotate and the first leg to move the shutter to the open position; and
a torsion spring, mounted on the shaft of the retainer, which applies a force to the cam body, which causes the first leg to move the shutter to the closed position when the circuit breaker is withdrawn or absent from the cradle.

4. The system of claim 3, wherein the cam body further comprises a third leg configured to cam against an interior surface of an opening in one of the side walls.

5. The system of claim 4, wherein the shutter includes:
a first shutter frame having a plurality of first openings, and
a second shutter frame having a plurality of second openings and movably mounted on the first shutter frame, the second shutter frame having a tab moveably engaged in a slot of the first shutter frame, the first leg of the cam body configured to engage the tab and cause the shutter to move between the open position in which the first and second openings of each shutter frame are aligned to expose the buses and the closed position in which the buses are covered.

6. The system of claim 5, wherein the first shutter frame and the second shutter frame include slots and posts for snapping the first and second shutter frames together.

7. The system of claim 1, wherein each of the rail assemblies includes a clip assembly, mounted on the slider of the rail and configured to clip onto a portion of the shutter.

8. The system of claim 1, wherein the spring guide of each of the rail assemblies includes a self-locking tab and each of the rail assemblies includes a barrel for housing the spring guide, the barrel including an L-shaped groove configured to receive the self-locking tab, the self-locking tab moveable into and along a longitudinal portion of the groove to lock and guide, respectively, the spring guide in the barrel.

9. The system of claim 1, wherein each of the rail assemblies includes a resilient retention tab configured to engage an opening in a side wall of the cradle.

10. The system of claim 1, wherein the bottom of each slider is configured to slide along a top groove of a corresponding racking rail of a racking system connected to a corresponding side wall of the cradle.

11. A circuit breaker cradle comprising:
a housing for a rack out circuit breaker, the housing including:
two opposing side walls,
a back wall, and
a front opening through which to receive the circuit breaker; and
a shutter system comprising:
a first rail assembly configured to snap into an interior surface of one of the side walls of the housing and a second rail assembly configured to snap into an interior surface of the other of the side walls of the housing, each of the rail assemblies including:
a snap-in lock assembly having:
a tab configured to engage an opening in a side wall of the housing, and
a spring guide, at an end of the rail, which is configured to exert a force against the back wall of the housing to lock the rail along the side wall when the tab is engaged in the opening, and
a slider movable between a front and back of the housing along the side wall;
a shutter connected to and between the sliders, the shutter being configured:
to move with the sliders toward the back of the housing and into an open position which allows access to buses at the back of the cradle when racking in the circuit breaker, and
to move with the sliders away from the back of the cradle and into a closed position which restricts access to the buses at the back of the housing when racking out the circuit breaker; and
a cam actuator, arranged on the first rail assembly or the second rail assembly, configured to cause the shutter to move to the open position when racking in the circuit breaker, and to the closed position when racking out the circuit breaker.

12. The cradle of claim 11, wherein the cam actuator comprises:
a retainer having a shaft;
a cam body connected to rotate on the shaft, the cam body including:
a first leg configured to cause the shutter to move between the open position and the closed position, and
a second leg configured to cam against a portion of the circuit breaker when moved toward the back of the housing, thereby causing the cam body to rotate and the first leg to move the shutter to the open position; and a torsion spring, mounted on the shaft of the retainer, which applies a force to the cam body, which causes the first leg to move the shutter to the closed position when the circuit breaker is withdrawn or absent from the cradle.

13. The cradle of claim 12, wherein the cam body further comprises a third leg configured to cam against an interior surface of an opening in one of the side walls.

14. The cradle claim 11, wherein the shutter includes:
a first shutter frame having a plurality of first openings, and
a second shutter frame having a plurality of second openings and movably mounted on the first shutter frame, the second shutter frame having a tab moveably engaged in a slot of the first shutter frame, the first leg of the cam body configured to engage the tab and cause the shutter to move between the open position in which the first and second openings of each shutter frame are aligned to expose the buses and the closed position in which the buses are covered.

15. The cradle of claim 11, wherein each of the rail assemblies includes a clip assembly, mounted on the slider of the rail and configured to clip onto a portion of the shutter.

16. The cradle of claim 11, wherein the spring guide of each of the rail assemblies includes a self-locking tab and each of the rail assemblies includes a barrel for housing the spring guide, the barrel including an L-shaped groove configured to receive the self-locking locking tab, the self-locking tab moveable into and along a longitudinal portion of the groove to lock and guide, respectively, the spring guide in the barrel.

17. The cradle of claim 11, wherein each of the rail assemblies includes a resilient retention tab configured to engage an opening in a side wall of the housing.

18. The cradle of claim 11, further comprising:
a racking system for moving the breaker toward and away from the back wall of the housing, the racking system including two racking rails connected on opposing side walls, each racking rail arranged below one or the other of the first and second rail assemblies,
wherein a bottom of each slider is configured to slide along a top groove of a corresponding racking rail.

19. The cradle of claim 11, wherein when the shutter is in the closed position, polarization force is applied by a compression spring of the spring guide on the rail assemblies, and the loading shifts from the rail assemblies to the back wall when racking in the circuit breaker.

20. The cradle of claim 11, wherein the tab of the snap-in lock assembly includes a plurality of tabs including a resilient locking tab.

* * * * *